Jan. 23, 1923. 1,442,856
F. G. CHRISTENSEN.
PROCESS AND APPARATUS FOR MAKING PHONOGRAPH RECORDS.
FILED OCT. 30, 1919.
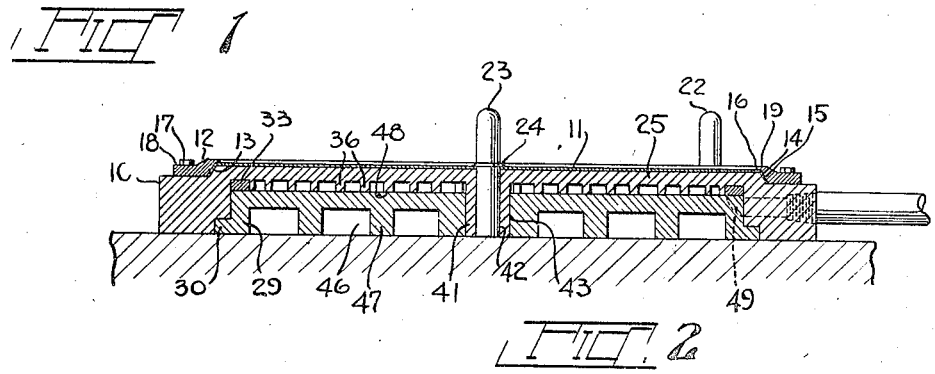
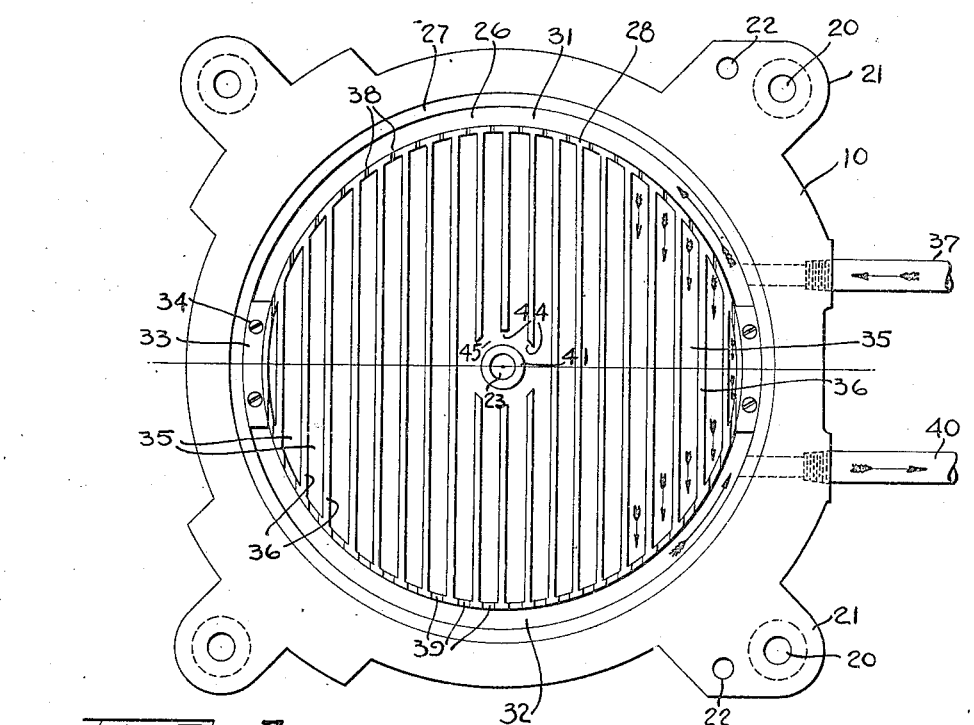
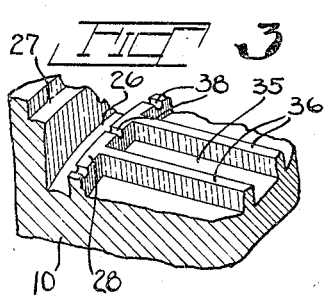
INVENTOR
F. G. Christensen
BY
H. H. Dyke
ATTORNEY Patented Jan. 23, 1923.

1,442,856

UNITED STATES PATENT OFFICE.

FRED G. CHRISTENSON, OF BROOKLYN, NEW YORK, ASSIGNOR TO PATHE FRERES PHONOGRAPH COMPANY, A CORPORATION OF DELAWARE.

PROCESS AND APPARATUS FOR MAKING PHONOGRAPH RECORDS.

Application filed October 30, 1919. Serial No. 334,603.

*To all whom it may concern:*

Be it known that I, FRED G. CHRISTENSON, a citizen of the United States, and a resident of Brooklyn, county of Kings, and State of New York, have invented certain new and useful Improvements in Process and Apparatus for Making Phonograph Records, of which the following is a specification.

My invention relates to a process of making molded phonograph records, and also to apparatus for carrying out the process.

An object of the invention is the provision of a press die which can be readily and quickly heated and readily and quickly cooled by suitable media, such as hot water and steam for heating, and cold water for cooling. Another object of the invention is the provision of an improved process of heating and cooling the press dies.

Other objects of the invention will appear in connection with the following description, and with the foregoing and related objects in view, my invention consists in steps, processes, features of construction and combinations hereinafter set forth and claimed.

In the accompanying drawings forming a part of the specification, Fig. 1 is a transverse sectional view of a press die in accordance with my invention. Fig. 2 is a bottom plan view of the die shown in Fig. 1, with the bottom plate or closure omitted in order to show the interior construction, and Fig. 3 is a fragmentary perspective detail view of the press plate, also inverted.

10 is a press die plate of good conductive material. It may be a metal casting, for example.

11 is a thin unbacked matrix, preferably made by plating copper on a phonograph record. It is secured direct to plate 10 as by a ring 12. The attachment of matrix to plate is so arranged as to hold the matrix securely in place, to exclude record material from getting under the edges of the matrix, and to provide means for defining or forming the margin of the moulded record.

In the form shown, the plate 10 is cut away about the margin on a bevel as shown at 13, the matrix 11 is provided with the marginal part 14, spun, bent or otherwise forced out of the plane of its surface to lie on the bevel 13, and the ring 12 has the corresponding under bevel 15, whereby the marginal portion 14 of matrix 11 is clamped and securely held and the record moulding material effectively prevented from getting under the edges of the matrix. The ring 12 also has a flange 16 fitting over the matrix 11 and assisting in holding the matrix in place and excluding record material from getting under the edges thereof, and such flange 16, together with the flange on the similar opposing press die and matrix (not shown) define and form the margins of the moulded record.

Various means for holding the ring 12 in place may be resorted to, as for example, bolts 17 may be used for this purpose and the ring 12 may be cut away as shown at 18 to make room for the bolt heads or other fastening members, and to make the top 19 of flange 16 desirably narrow, which is of advantage in forming a clean cut record margin.

The die may be secured in place in a press in any desirable way, as by means of bolts or the like passed through holes 20 in the lugs or ears 21. Dowels 22 are preferably provided in one of the dies of each set to be received in guide holes in the other die of a pair, and, with the central pin 23, serve to guide the dies into true and correct coacting relation.

Means for holding the matrix at the middle and preventing record material from getting thereunder are preferably provided, and in the form shown the pin 23 is provided with a narrow flange 24 for this purpose.

As the record output of a press depends to a considerable extent upon the time the press remains closed in the making of each record, it is important that the heating and cooling media be conducted in and out rapidly and with substantial uniformity in all parts of the die plate.

The present invention provides a mode of accomplishing these results efficiently and with apparatus adapted to be cheaply and rapidly constructed and to stand up well in use.

A preferably circular channel 26 having a shoulder 27 is formed in the back of die plate 10. Channel 26 has a relatively low inner wall 28. A closure plate or plug 29 is received in the recess so provided in the die plate 10. The inner face thereof rests against wall 28 and the flange 30 in the margin of closure 29 is received within the shouldered portion 27, making the back of closure member 29 substantially flush with the back of plate 10, as appears from Fig. 1. The closure may be welded or otherwise secured in place, if desired, but it is sufficient to force it into place under high pressure making a force fit.

Channel 26 is divided into two substantially semi-circular parts or chambers 31 and 32 by suitable means, such as plugs 33 secured in place by suitable fastening devices such as screws 34. Passages 35 extend across the die plate from chamber 31 to chamber 32. Such passages are separated by ribs 36 formed on the portion 25 of die plate 10, and communicate with chamber 31, which is the inlet chamber, served by pipe 37, by comparatively narrow slots or openings 38. The outlet from passages 35 is through the relatively enlarged slots or openings 39 into outlet chamber 32 which discharges through outlet pipe 40.

Inlets 38 and outlets 39 may conveniently be formed in casting or by milling sections out of the wall 28, as shown in Figs. 2 and 3, but may be otherwise formed, if desired. A boss 41 is formed on die plate 11 about the opening 42 for pin 23, and the closure 29 has an opening 43 of suitable dimensions to fit over said boss 41. Certain of the ribs 36 are preferably interrupted as shown at 44 to provide the passage 45 around the boss 41 and permit the flow of heating and cooling media therearound.

The material of closure 29 may be cut out on the back as shown at 46, 46 to such extent as to provide lightness consistent with the necessary strength. The integral ribs 47, 47 serve to reinforce and strengthen without making the device unduly heavy.

The inner face 48 of closure 29 is finished plane and fits closely against the faces of wall 28 and ribs 36 so that leakage therebetween, if any, is so small as to be substantially negligible.

It will be seen that a die in accordance with my invention can be rapidly and cheaply constructed, that it serves efficiently to conduct heat and cold direct to the thin unbacked matrix and that the circulation of heating and cooling media is rapid and direct, circuitous passages of any kind being avoided. The inlet openings 38 being constricted with relation to the outlet openings 39, the water, steam, etc. substantially fills the inlet chamber 31 before any substantial portion thereof gets through opening 38 into passages 35 and it is therefore distributed substantially uniformly through the various cross passages 35 and escapes easily and rapidly through the enlarged openings 39, so that heat may be supplied or withdrawn with substantial evenness and with great rapidity aver the entire surface of the die and matrix.

It will be seen that the inlet and outlet pipes 37 and 40 are connected direct to the plate 10 and communicate direct with inlet and outlet chambers 31 and 32 formed in plate 10 and no passages are formed in the closure 29 for fluid circulation, except that notches 49 are cut therein to provide free communication between inlet and outlet openings 37 and 40 and the inlet and outlet chambers 31 and 32.

It is to be understood that the apparatus illustrated is for affording an understanding of my invention only, and changes and modifications may be resorted to within the scope of my claims without departing from my invention or sacrificing the advantages thereof.

I claim:

1. A circular die for pressing circular objects from plastic material, having curved inlet and outlet chambers at opposite sides thereof and chord like passages therebetween.

2. A circular die for pressing circular objects from plastic material, having inlet and outlet chambers at opposite sides thereof, and a plurality of straight line, substantially parallel passages therebetween.

3. A die for pressing circular objects from plastic material having part circular inlet and outlet chambers, and chord like connecting passages therebetween.

4. In a die for pressing phonograph records inlet and outlet chambers each forming an arc of a circle and substantially straight cross-connecting passages therebetween.

5. A die for pressing phonograph records comprising a plate with a substantially circular passage therein and divided into two parts, a series of ribs forming therebetween a series of cross passages extending from one of said parts to another, a wall between circular and cross passages, notches in said wall and a closure plate fitting closely against said wall and ribs.

6. In a die for pressing flat objects from plastic material, an inlet chamber extending part way about the die at substantially the margin thereof, a series of passages, and relatively small openings extending from said chamber to said passages.

7. In a die for pressing flat objects from plastic material, an inlet chamber, an outlet chamber, passages extending from chamber to chamber, a series of relatively small openings of substantially uniform size extending from the inlet chamber to the passages and a series of relatively large openings extending from passages to outlet chamber.

8. A die for pressing phonograph records comprising a pair of substantially semi-circular fluid passages and cross passages communicating at their opposite ends with the first named passages.

9. A die for pressing phonograph records comprising inlet and outlet chambers each extending part way about the die at substantially the margin thereof, and passages connecting said inlet and outlet chambers, the openings from said passages into the inlet chambers being smaller than the openings from the passages to the outlet chamber.

10. A die for pressing phonograph records comprising fluid inlet and outlet chambers each extending part way about the die at substantially the margin thereof, cross connecting passages therebetween with relatively constricted openings from inlet chamber to passages and relatively enlarged openings from passages to outlet chamber.

11. A die for pressing flat objects from plastic material comprising a die plate having a circular channel, plugs dividing said channel into two parts, cross channels leading from one of said parts to the other, and inlet and outlet openings for said parts and a closure for all of said channels.

12. The process of heating and cooling a die for making phonograph records from plastic material, which consists in supplying fluid to an inlet chamber and distributing same to substantially straight parallel passages connected therewith through constricted openings, whereby the fluid is delivered to each of the passages in substantially the same interval of time.

In testimony that I claim the foregoing, I hereto set my hand, this 28th day of October, 1919.

F. G. CHRISTENSON.